United States Patent
Guignard et al.

(10) Patent No.: US 8,588,608 B2
(45) Date of Patent: Nov. 19, 2013

(54) METHOD FOR MANAGING THE CONNECTION IN AN OPTICAL ACCESS NETWORK, CORRESPONDING PLATFORM, CENTRAL OFFICE, AND COMPUTER PROGRAM PRODUCT

(75) Inventors: Philippe Guignard, Pleumeur Bodou (FR); Roman Glatty, Marcoussis (FR); Fabrice Bourgart, Perros Guirec (FR)

(73) Assignee: France Telecom, Paris (FR)

( * ) Notice: Subject to any disclaimer, the term of this patent is extended or adjusted under 35 U.S.C. 154(b) by 731 days.

(21) Appl. No.: 12/444,261

(22) PCT Filed: Sep. 27, 2007

(86) PCT No.: PCT/FR2007/052024
§ 371 (c)(1),
(2), (4) Date: Apr. 3, 2009

(87) PCT Pub. No.: WO2008/040900
PCT Pub. Date: Apr. 10, 2008

(65) Prior Publication Data
US 2010/0034535 A1 Feb. 11, 2010

(30) Foreign Application Priority Data

Oct. 4, 2006 (FR) ...................................... 06 08704

(51) Int. Cl.
*H04B 10/08* (2011.01)
*H04B 10/00* (2013.01)
(52) U.S. Cl.
USPC ............................ 398/25; 398/167.5; 398/168
(58) Field of Classification Search
USPC .......................................... 398/25, 167, 168
See application file for complete search history.

(56) References Cited

U.S. PATENT DOCUMENTS

| | | | | |
|---|---|---|---|---|
| 6,574,018 B1* | 6/2003 | Handelman | ..................... | 398/49 |
| 7,016,608 B1* | 3/2006 | Ball et al. | ......................... | 398/71 |
| 7,277,450 B2* | 10/2007 | Neeley et al. | ................. | 370/420 |
| 7,330,655 B2* | 2/2008 | Kim et al. | ........................ | 398/72 |
| 7,502,563 B2* | 3/2009 | Nozue et al. | ..................... | 398/69 |
| 7,725,030 B2* | 5/2010 | Nozue et al. | ..................... | 398/69 |
| 2002/0021472 A1* | 2/2002 | Nakaishi | ....................... | 359/168 |
| 2002/0071149 A1* | 6/2002 | Xu et al. | ........................ | 359/110 |
| 2002/0109875 A1* | 8/2002 | Eijk et al. | ....................... | 359/110 |

(Continued)

FOREIGN PATENT DOCUMENTS

WO 03/005156 1/2003

OTHER PUBLICATIONS

French Search Report from corresponding foreign Application No. FR0608704, dated Oct. 4, 2006.

(Continued)

*Primary Examiner* — Ken Vanderpuye
*Assistant Examiner* — Abbas H Alagheband
(74) *Attorney, Agent, or Firm* — Westman, Champlin & Koehler, P.A.; David D. Brush (57) ABSTRACT

A method is provided for managing connections in an optical access network. Also provided are a corresponding platform, exchange, network and computer software product. The method manages connections of a plurality of user modules to a plurality of transmission modules of an exchange in an optical access network. The management method includes a dynamic re-arrangement of the connection of at least one of the user modules to at least one of the transmission modules according to at least one predetermined optimization criterion.

9 Claims, 3 Drawing Sheets

(56) References Cited

U.S. PATENT DOCUMENTS

| | | | |
|---|---|---|---|
| 2003/0012485 A1* | 1/2003 | Neeley et al. | 385/16 |
| 2004/0213256 A1* | 10/2004 | Muys et al. | 370/395.1 |
| 2005/0129400 A1* | 6/2005 | Kim et al. | 398/67 |
| 2006/0198408 A1* | 9/2006 | Park et al. | 372/38.02 |
| 2006/0198634 A1* | 9/2006 | Ofalt et al. | 398/16 |
| 2007/0058973 A1* | 3/2007 | Tanaka | 398/1 |
| 2007/0092256 A1* | 4/2007 | Nozue et al. | 398/72 |
| 2009/0110400 A1* | 4/2009 | Nozue et al. | 398/71 |

OTHER PUBLICATIONS

International Preliminary Report on Patentability from corresponding Application No. PCT/FR2007/052024, filed Sep. 27, 2007.

* cited by examiner

METHOD FOR MANAGING THE CONNECTION IN AN OPTICAL ACCESS NETWORK, CORRESPONDING PLATFORM, CENTRAL OFFICE, AND COMPUTER PROGRAM PRODUCT

CROSS-REFERENCE TO RELATED APPLICATIONS

This Application is a Section 371 National Stage Application of International Application No. PCT/FR2007/052024, filed Sep. 27, 2007 and published as WO 2008/040900 on Apr. 10, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of optical telecommunications networks.

The disclosure can be applied especially in optical access networks, for example Passive Optical Networks or PONs.

BACKGROUND OF THE DISCLOSURE

PON architecture is being used today by certain telecommunications operators for forthcoming major optical deployments for residential customers. Given the volume of equipment and infrastructure to be installed, the search for minimum investment costs is of particular importance in this sphere.

Figure 1:
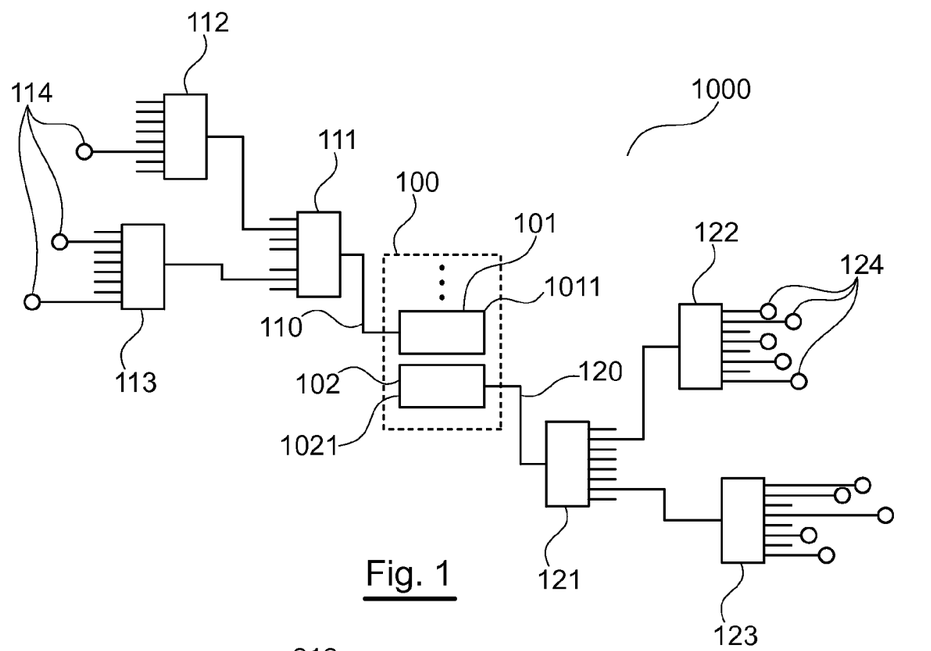
FIG. 1, which is already been commented upon with reference to the prior art, is a simplified drawing of a passive optical access network.

The choice of the PON architecture reduces investment costs since it enables the pooling of a part of the equipment and infrastructure FIG. 1 is a simplified drawing of a passive optical network PON 1000. The PON 1000 comprises a central office 100 itself comprising several frames 101, 102 which are optical line terminations or OLTs.

In each frame 101, 102, it is possible to insert several PONs (not shown) comprising one or more physical interfaces, each constituting the starting point of an optical tree structure. Here below, these interfaces are called transmission modules. In the context of FIG. 1, the description pertains to a particular case in which the frames 101, 102, each comprise a single transmission module 1011 and 1021 constituting the starting point of an optical tree structure 110, 120.

Each of the tree structures 110, 120 has characteristics laid down by the different ITU (International Telecommunications Union) standards issued by the FSAN (Full Service Access Network) group, for example the G.983, G.984 recommendations or the IEEE 802.3ah standard.

These standards in particular specify the maximum physical partitioning rate for the optical infrastructure and the constraints on the length of the links between the central office 100 and the user modules, these two variables being dependent because they form part of an optical budget range.

The tree structure 110 comprises for example two coupling levels based on three 1×N couplers (where N is a positive integer, for example equal to 8) 111, 112, 113 to which optical network terminations 114 or ONTs, below designated as user modules, are connected.

The tree structure 120 has two coupling levels based on three 1×N couplers 121, 122, 123 to which optical network terminations 124 are connected.

A management platform (not shown) hosted by a station (for example a PC, a server etc) is connected to the different PON cards of the transmission modules 1011, 1021 of the central office 100 in order to configure the exchanges between the transmission modules 1011, 1021 and the ONT user modules 114, 124 and centralize the different pieces of information on management of the PON 1000.

Flexibility in the time domain is defined in the context of the ITU standards issued by the FSAN group: this is a case of dynamic bandwidth allocation or DBA aimed at dynamically providing extra capacity, in the network intake sense (the uplink direction), to the user modules 114, 124, that ask for it by reusing resources not specifically used by other user modules 114, 124.

A classic scheme of deployment of a PON corresponds to a tree structure comprising two coupling levels, each based on 1×8 cascade-mounted couplers.

In the case of a low density of user modules, the first coupler can be situated at the level of the central office to favor rapid filling of the optical interface to the detriment of the efficiency of partitioning of each fiber which thereafter is shared between only eight user modules.

The trend nevertheless is towards sufficient densification of the user modules, implying that a first coupler is situated at a distance from the central office, for example at the end of a first fiber section or feeder. In this case, the essential part of the route of the fiber is shared, thus providing for substantial economic optimization.

Thus, in the case of great density of user modules, the making of conduits (in public works undertakings) used by the fiber calls for the paving of the entire zone to be connected with a consequent sub-division into plates of this zone to be connected.

The main three parameters that have a direct effect on the number of transmission modules associated with a PON card to be deployed in the central office are:
  the distribution of the clients (or user modules) as a function of the configuration of the paths that may be taken by the cables;
  the total payload bit rate per optical interface at the central office;
  the rate of physical partitioning per optical interface at the central office.

The effect of the latter two parameters is obvious:
  as soon as the aggregate bit rate (or sum of the bit rates) to or from all the user modules exceeds the maximum bit rate that can be sent or received by the transmission modules connected to the central office, it becomes necessary to implement a new transmission module, even if the maximum partitioning rate allowed at the optical budget level is not attained;
  as soon as the number of user modules connected reaches the maximum physical partitioning rate of the transmission module, it becomes also necessary to implement a new transmission module, even if the total or aggregate bit rate to or from the user module is lower than the maximum bit rate that can be sent or received by the transmission module.

The parameter linked to the distribution of the clients as a function of the configuration of the paths that can be taken by the cables has a direct influence on the number of transmission modules to be deployed in the central office owing to the configuration of the conduits and the resulting sub-division into hubs.

Indeed, if clients associated with user modules request a connection and if they are situated in a direction that corresponds to no starting point of an already installed PON card, then it is necessary to install a new transmission module associated with a starting point of a PON card of the central office in order to service them.

Classically, it is sought in principle to optimize the use of the capacities of the transmission modules (whether in terms of partitioning rate, aggregate bit rate or distribution of clients as a function of the configuration of the paths that the cables can take) at the time of the physical installation of the network and possibly at the time of the installation of new transmission modules in the network.

However, since this optimizing is done in principle, at the time of the installation of the network, and since the needs of the users (whether in terms of partitioning rate, aggregate bit rate or distribution of clients, or user modules) as a function of the configuration of the paths that can be taken by the cables change and develop constantly especially after the installation of the network, this optimizing proves to be complicated and inefficient.

Thus, in certain cases, an under-utilization can be seen in the capacities of the transmission modules of the PONs.

There is therefore a need for a technique to overcome these drawbacks of the prior art.

Furthermore, a technique of this kind should make it possible to optimize the use of the capacities (especially in terms of partitioning rate or aggregate bit rate) of the transmission modules of the central office of an optical access network.

A technique of this kind should also be capable of reducing the quantity of apparatuses to be deployed in such a network and therefore reduce the costs and space requirement of the network.

Such a technique should also make it possible to provide greater flexibility in the use of the access network.

SUMMARY

An exemplary embodiment of invention enables this need to be met by proposing a method for managing the connection of a plurality of user modules to a plurality of transmission modules of a central office in an optical access network.

According to an embodiment of the invention, this method comprises a step for the dynamic rearranging of the connection of at least one of the user modules to at least one of said transmission modules as a function of at least one predetermined criterion of optimization.

The general principle of an embodiment of the invention thus consists of a dynamic management of the connections of the user modules to the transmission modules of the central office implemented especially on a subsequent basis, after the physical installation of the network, as a function of at least one criterion for example defined by an operator.

Naturally, this dynamic management of the connections of the user modules to the transmission modules of the central office can be implemented at the very outset, at the time of the physical installation of the network.

Thus, the step of dynamic rearrangement makes it possible to optimize the use of the capacities of the transmission modules of the central office. Indeed, it makes it possible to increase the number of user modules connected to the central office and/or the aggregate bit rate of the central office for a given number of transmission modules and to provide the central office with a higher level of service for a same number of apparatuses.

It also reduces the quantity of equipment and especially of transmission modules to be deployed in the central office and hence reduces the costs and space requirement of the network.

Thus, this management method is used to procure high flexibility in the use of the access network. It can be used to complement the dynamic bandwidth allocation (or DBA) mechanism mentioned here above in order to provide flexibility in the time domain to the network access.

According to one embodiment, the flexibility provided by the invention is "slow": it corresponds to a time scale of several days (or more) in the case of the optimization of a deployment or a few minutes to a few hours in the case of an optimizing of traffic between active/inactive clients. In the latter case, various scenarios of interest to an operator can be imagined: for example the connections can be reconfigured in taking account of different traffic profiles for day and night operations or the inactivity of the clients (short or long absences) can be taken advantage of to reallocate the resources rendered that become temporarily available.

It can be noted that in the case of allocation of resources during shorter durations (of the order of one second or even less), the DBA mechanism constitutes a satisfactory solution.

For example, the optimizing criterion or criteria is/are defined by the operator and may be:

the maximum filling (in terms of connection of user modules) of the transmission modules in taking advantage of the granularity of the bit rates proposed to the different user modules (similarly to the defragmentation of a PC hard disk drive);

the balanced distribution of the user modules on the transmission modules in terms of aggregate bit rate, in mixing the different bit rate profiles on each transmission module. It is then possible to leave a margin of bit rate available in each transmission module to meet localized, one-time requests for higher bit rates;

the grouping of the bit rates of the same magnitude on the different transmission modules;

the grouping of the user modules with QoS (Quality of Service) requests of the same magnitude on the different transmission modules;

the best compromise between partitioning rate and filling rate in terms of bit rate of the transmission module.

Furthermore, through the step for rearranging connections, an embodiment of the present invention, by optimizing the use of the capacities of the transmission modules in operation in the PON, reduces (or even cancels out) the number of redundant transmission modules to be planned in a PON as compared with the classic example where it is possible to plan for up to one redundant transmission module for each transmission module in operation.

According to one characteristic of an embodiment of the invention, the step of dynamic rearrangement is activated upon the detection of at least one of the events belonging to the group consisting of:

introduction of a new user module into said access network;

introduction of a new transmission module into said access network;

request for modification of a bit rate associated with at least one user module;

detection of at least one case of congestion (for example temporary congestion) in bit rate (at reception or transmission) in a transmission module;

occurrence of a periodic event (for example a time slot).

In one embodiment of the invention, each transmission module is adapted to sending signals at a predetermined sending wavelength characteristic of the transmission module and to receiving signals at a predetermined reception wavelength characteristic of the transmission module, each user module is adapted to sending signals at a tunable sending wavelength and to getting tuned to a particular reception wavelength, and a user module is connected to a transmission module when the sending wavelength of the user module is tuned so as to be identical to the reception wavelength of the transmission module, and the user module is tuned to the sending wavelength of the transmission module.

Thus, the rearrangement of the connections is obtained, for example, through the introduction of the tunability of the transmission and reception wavelengths.

According to one embodiment of the invention, the rearrangement step comprises:

a step for obtaining a topology representing the connection of each of the user modules to the transmission modules;

a step for switching over the connection of at least one switched-over user module from a source transmission module to a destination transmission module as a function of said at least one predetermined criterion of optimization.

According to one characteristic of an embodiment of the invention, the switch-over step comprises the following steps:

sending the source module a switch-over command which is then transmitted to the switched-over user module;

tuning the sending wavelength of the switched-over user module to the reception wavelengths of the destination transmission module; and tuning the reception wavelength of the switched-over user module to the sending wavelength of the destination transmission module.

According to one characteristic of an embodiment of the invention, at each connection of a new user module to the central office, the new user module is initially connected to a default transmission module.

Thus, a part of the bit rate of the default transmission module is reserved so that there is no blockage at the arrival of new user modules. According to one variant, the default transmission module is reserved for actions of management, such as the connection of a new user module.

According to one embodiment of the invention, in the event of dysfunction of a first transmission module, the management method comprises the following steps:

selecting at least one user module known as a priority user module or user modules, connected to the first transmission module as a function of at least one predetermined criterion;

connecting said at least one priority user module or user modules to at least one second transmission module.

Thus, it is possible to guarantee a level of reliability and higher quality of service for one or more user modules associated with priority clients even in the event of malfunction in one or more transmission modules to which the client or clients are connected.

An embodiment of the invention also concerns a computer program product downloadable from a communications network and/or stored on a computer-readable medium and/or executable by a microprocessor, characterized in that it comprises program code instructions for the implementation of the method for managing as described here above.

An embodiment of the invention also concerns a platform for managing the connection of a plurality of user modules to a plurality of transmission modules of a central office in an optical access network.

According to an embodiment of the invention, such a platform comprises means for dynamic rearranging of the connection of at least one of the user modules to at least one of said transmission modules as a function of at least one predetermined criterion of optimization.

An embodiment of the invention also concerns a central office of an optical access network comprising a plurality of transmission modules connected to a plurality of user modules of the network.

According to an embodiment of the invention, such a central office comprises means for dynamic rearranging of the connection of at least one of said user modules to at least one of said transmission modules as a function of at least one predetermined criterion of optimization.

The advantages of the computer program product, management platform and central office are substantially the same as those of the method for managing as described here above and are not described in more ample detail.

An embodiment of the invention also concerns an optical access network comprising a plurality of user modules connected to a plurality of transmission modules of the network.

According to an embodiment of the invention, such an optical access network comprises means for dynamic rearranging of the connection of at least one of said user modules to at least one of said transmission modules as a function of at least one predetermined criterion of optimization.

The advantages of the optical access network are substantially the same as those of the method for managing as described here above and are not described in more ample detail.

According to one embodiment of the invention, each transmission module is adapted to sending signals at a predetermined sending wavelength characteristic of the transmission module and to receiving signals at a predetermined reception wavelength characteristic of the transmission module, each user module is adapted to sending signals at a tunable sending wavelength and to getting tuned to a particular reception wavelength, and a user module is connected to a transmission module when the sending wavelength of the user module is tuned so as to be identical to the reception wavelength of the transmission module, and the user module is tuned to the sending wavelength of the transmission module.

According to a first mode of implementation of an embodiment of the invention, the transmission modules are connected to the user modules by means of a tree structure comprising at least one M×N coupler where M and N are positive natural integers.

Thus, each of the user modules receives all the signals sent by all the transmission modules. Thus, great flexibility is obtained in the rearrangements of the connection of the user modules.

According to a second mode of implementation of an embodiment of the invention, the transmission modules are connected to the user modules by means of a tree structure comprising at least one optical demultiplexer with cyclic response.

Thus, each of the user modules receives only one part of the signals sent out by all the transmission modules. Consequently, the wavelength filtering means do not need to be very selective.

Naturally, it is also possible in one variant of this second embodiment to implement at least one optical demultiplexer with non-cyclic response.

BRIEF DESCRIPTION OF THE DRAWINGS

Other features and advantages shall appear more clearly from the following description of several embodiments, given by way of simple, non-exhaustive and illustrative examples, and from the appended drawings, of which.

DETAILED DESCRIPTION OF ILLUSTRATIVE EMBODIMENTS

Figure 2:
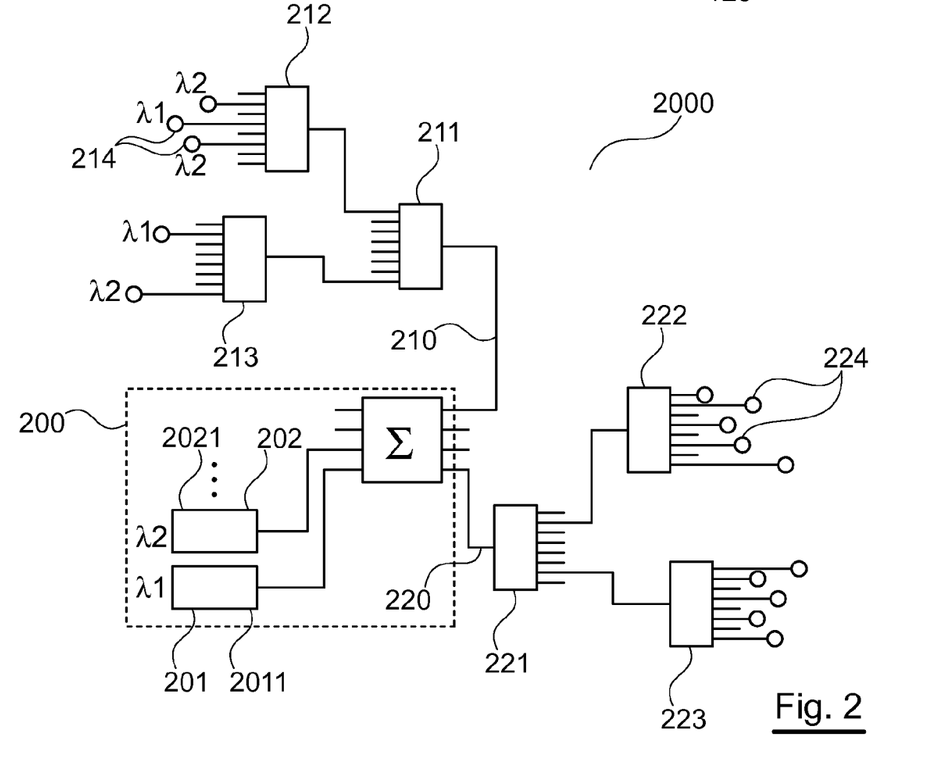
FIG. 2 is a simplified drawing of a passive optical access network according to one embodiment of the invention.

Here below, the description shall relate to a passive optical access network 2000 according to one embodiment of the invention.

A simplified drawing of the passive optical access network 2000 is shown in FIG. 2.

The network 2000 has a central office 200 itself comprising a plurality of frames 2011, 2021. In this FIG. 2, only two frames have been shown but, naturally, the PON can comprise any number whatsoever of frames.

Each frame 2011, 2021 can have several PON cards (not shown) inserted into it and comprising one or more physical interfaces, each forming the starting point of an optical tree structure. Here below, these physical interfaces are called "transmission modules". This FIG. 2 is situated in the context of a particular case in which the frames 2011, 2021 each comprise a single transmission module 2011 and 2021 constituting the starting point of an optical tree structure 210, 220.

In this embodiment, the tree structure 210 has two coupling levels based on three 1×N couplers (where N is a positive natural integer, for example equal to 8), 211, 212, 213 to which the user modules 214 are connected.

In this embodiment, the tree structure 220 has two coupling levels based on three 1×N couplers 221, 222, 223 to which the user modules 224 are connected.

Naturally, these tree structures 210, 220 may include any number whatsoever of couplers of any type whatsoever, for example of the M×N type (where N and M are positive natural integers).

Thus, in the PON 2000, a set of transmission modules (for example five such modules) "jointly" serves a broadened hub of user modules (for example 15 such modules).

In the context of implementing an embodiment of the invention, each of the transmission modules 2011, 2021 is adapted to sending transmission signals at a fixed sending wavelength and to receiving reception signals at a fixed reception wavelength. The reception wavelengths of the transmission modules are all distinct from one another and the sending wavelengths of the transmission modules are all distinct from one another.

Thus, each transmission module is associated with a pair of wavelengths comprising a sending wavelength and a reception wavelength, the pair of wavelengths being predetermined and being characteristic of the transmission module.

Furthermore, each of the user modules 214, 224 is adapted to sending transmission signals at a sending wavelength which is tunable and to getting tuned to a particular reception wavelength.

Thus, each user module is associated with a pair of wavelengths comprising a sending wavelength and a reception wavelength, the functions of sending and of selection in reception of the wavelengths of the pair being tunable.

A user module is connected to a transmission module when the sending wavelength of the user module is tuned so as to be identical to the reception wavelength of the transmission module and the user module is tuned to the sending wavelength of the transmission module.

Because the sending wavelengths of the user modules are tunable and because the user modules are tunable in reception, each user module can receive and send signals from and to any unspecified transmission module on the network 2000 on condition that its sending wavelength is pre-tuned so that this wavelength is equal to the reception wavelength of the transmission module concerned and on condition that its reception wavelength is pre-tuned so that it can receive the sending wavelength of the concerned transmission module.

According to the invention, several embodiments of the user modules and of the transmission modules are possible, each corresponding to the introduction of particular optical functions in the network 2000.

With respect to the transmission modules 2011, 2021, a first embodiment of the invention consists in implementing a light source (for example of the laser type) emitting at a fixed (emission) wavelength in transmission and an optical filter at a fixed wavelength (of reception) placed before a reception photodetector.

It can be noted that the fixed filter is not obligatory (for example when a wavelength selection is made by a demultiplexer placed between the transmission module and the user module).

In order to make these transmission modules 2011, 2021 generic and so as to avoid having to manage a fleet of transmission modules, each manufactured at a different pair of wavelengths, a second embodiment of the invention consists in replacing the light source emitting a fixed wavelength and the filter with a fixed wavelength by tunable components which would be tuned once and for all when the transmission module is installed in the central office 200.

In this second embodiment, the tunability of the light source or of the filter can be obtained in the same way as the tunability (described in detail here below) of the light source or of the filter of the user modules.

The set of different wavelengths sent out by the transmission modules 2011, 2021, is then coupled in a set of fibers (each associated with one of the tree structures 210, 220 mentioned here above, constituting an equivalent number of starting points from the central office 200) using an element referenced Σ in FIG. 2. This element may be an N×N more generally an M×N passive coupler, or the association of an M×N optical multiplexer with a 1×N coupler or even any other unspecified association especially of couplers and/or multiplexers.

With respect to the user modules 214, 224, for reception, in compliance with an embodiment of the invention, it is possible to implement an optical filter whose (reception) wavelength is tunable, placed before a photodetector at reception; for the sending in compliance with an embodiment of the invention, it is possible to implement:

- a light source (for example a laser type light source) that is continuously tunable;
- a light source (for example of a laser type) tunable by hops (i.e. non-continuously);
- an array of light sources (for example of the laser type) in which the light source corresponding to the wavelength to be emitted is lit.

Furthermore, should the reception wavelength (in the downlink direction) and the sending wavelength (in the uplink direction) of a user module be identical, according to an embodiment of the invention, it is possible to implement a technique for re-utilizing the same wavelength with a "colorless" sender (i.e. a sender that erases the modulation of the signal at the reception wavelength coming from a transmission module which re-modulates and sends back the same signal at a same wavelength through the transmission module). This approach is less advantageous with respect to the optical budget but avoid the use of a tunable source at the client level.

A platform for managing the connection of the user modules 214, 224 (illustrated in FIG. 3) to the transmission modules 2011, 2021 according to the above-mentioned embodiment of the invention is hosted at the station (for example a PC, a server etc) and is connected to the different PON cards of the transmission modules 2011, 2021 of the central office 200.

Figure 3:
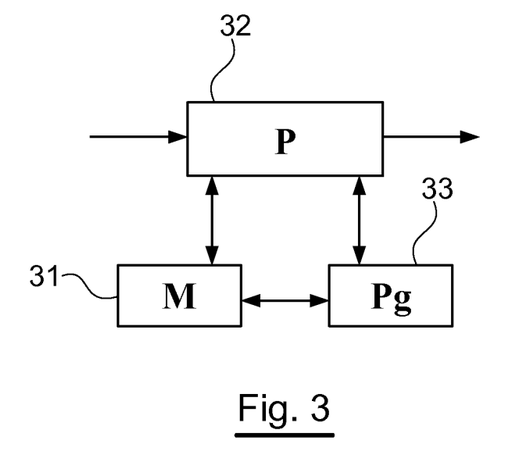
FIG. 3 is a drawing of a management platform implementing a method for managing the connection of the user modules to the transmission modules of the network of FIG. 2, according to one embodiment of the invention.

As illustrated in FIG. 3, this management platform comprises a memory 31, a processing unit 32, equipped for example with a microprocessor μP and driven by the computer program 33, implementing a method for managing according to the above-mentioned embodiment of the invention.

Thus, the program 33 comprises especially a dynamic rearrangement algorithm (described here below with reference to FIG. 4) implementing the step of dynamic rearrangement of the connection of the user modules to the transmission modules as a function of at least one predetermined criterion of optimization as described in detail here below.

At initialization, the code instructions of the computer program 33 are for example loaded into a RAM before being executed by the processor of the processing unit 32.

Thus, the microprocessor of the processing unit 32 implements the steps of the management method according to an embodiment of the invention so as to take charge of the connection of the user modules 214, 224 to the transmission modules 2011, 2021.

To this end, the management platform comprises means for the dynamic rearrangement of the connection of the user modules to the transmission modules as a function of at least one predetermined criterion of optimization as described in detail here below. These means are driven by the microprocessor of the processing unit 32.

In one particular embodiment of the invention, the management platform is included in the central office 200.

Thus, this management platform (not shown in FIG. 2) is used to configure exchanges between the transmission modules 2011, 2021 and the modules 214, 224 and to centralize the different pieces of information on the management of the PON 2000.

At the time of installation of the PON 2000, a first transmission module associated with a first pair of wavelengths comprising a first sending wavelength for the downlink (from the transmission module to the user modules) and a first reception wavelength for the uplink (from the user modules to the transmission module) is installed. This first pair of wavelengths is fixed and is characteristic of the first transmission module.

Then, user modules are connected to this first transmission module so long as it is not close to its maximum capacity.

It may be recalled that a user module is connected to this first transmission module as of the instant when the sending wavelength and the reception wavelength of the user module are tuned so as to be respectively equal to the reception wavelength and to the sending wavelength of the first transmission module.

When the request related to the connection of a new user module causes an overflow in the capacity of the firs transmission module, a second transmission module is activated. This second transmission module is associated with a second pair of wavelengths comprising a second sending wavelength for the downlink and a second reception wavelength for the uplink. The sending and reception wavelengths (which are fixed and characteristic of the second transmission module) of this second pair of wavelengths are respectively distinct from the sending wavelengths and reception wavelengths of the first pair of wavelengths.

The new user modules are then connected to this second transmission module.

The process is then renewed until each user module is connected to a transmission module.

For example this phase of installation of the PON 2000 forms part of the method for managing according to an embodiment of the invention.

After the installation of the PON 2000, the management platform applies an algorithm for the dynamic rearrangement of the connection of at least one of the user modules to at least one of the transmission modules as a function of at least one predetermined criterion of optimization.

For example, this dynamic rearrangement may be activated by the detection of at least one of the events belonging to the group comprising:

- introduction into the access network of a new user module;
- introduction into the access network of a new transmission module;
- request for modification of a bit rate associated with at least one user module;
- detection of congestion in bit rate in a transmission module;
- the occurrence of a periodic event (for example a time slot) etc.

It is assumed here below that this rearrangement is done at regular intervals.

This dynamic rearrangement of the connection of the user modules to the transmission modules which is implemented regularly is used especially to obtain an optimal filling of each transmission module in terms of numbers of clients connected or in terms of aggregate bit rate.

According to an embodiment of the invention, it is possible to favor different predetermined criteria of optimization corresponding to different modes of rearrangement.

For example, the criterion or criteria of optimization are defined by the operator and may be:

- the maximum filling (in terms of connection of user modules) of the transmission modules, in benefiting from the graininess of the bit rates proposed to the different user modules (similarly to the defragmentation of a PC hard disk drive)
- the balanced distribution of the user modules among the transmission modules in terms of aggregate bit rate in mixing the different bit rate profiles on each transmission module. It is then possible to leave an available margin of bit rate on each transmission module to comply with the localized, one-time requests for higher bit rates;

the grouping of the bit rates of a same magnitude on the different transmission modules;

the grouping of the user modules having QoS (Quality of Service) requests of the same magnitude on the different transmission modules;

the best compromise between rate of partitioning and filling in bit rate of the transmission module.

Figure 4:
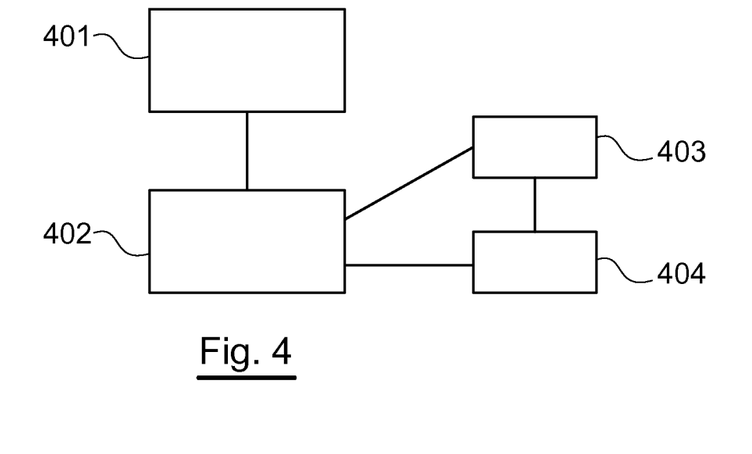
FIG. 4 shows the main steps of the dynamic rearrangement (implemented by a dynamic rearrangement algorithm) of the method for managing implemented by the management platform of FIG. 3.

FIG. 4 presents the main steps of the dynamic rearrangement, (implemented by the above-mentioned dynamic rearrangement algorithm) of the method for managing implemented by the management platform according to the above-mentioned embodiment of the invention.

First of all, the management platform implements a step 401 for obtaining a topology representing the connection of each of the user modules to the transmission module. It thus has access to the profiles of the connections of the user modules to the transmission modules (a profile integrates for example the requests for downlink and uplink bit rates, the QoS stipulated in the client contract etc). These profiles serve as input variables for the rearrangement algorithm.

Then, the management profile implements a step 402 for switching over the connection of a user module, from a source transmission module to a destination transmission module.

The switch-over step 402 comprises the following sub-steps:

generating and sending 403 the source transmission module a switch-over command which is then transmitted to the switched-over user module;

tuning 404 the transmission and reception wavelengths of the switched-over user module to the reception and sending wavelengths of the destination transmission module.

Then, the destination transmission module recognizes the switched-over user module through a recognition mechanism.

Thus, the dynamic arrangement according to an embodiment of the invention is truly integrated into the developments of the PON and is compatible with the working of current systems. Indeed, the switching system directly uses the mechanisms of recognition of a given user module by a given transmission module to which it is connected.

Indeed, according to this mechanism of recognition of a given user module by a given transmission module, when the given user module is connected to the given transmission module, the given user module starts listening to the messages coming from the given transmission module.

At the same time, the given transmission module periodically sends requests to the user modules that are connected to it and hence especially to the given user module to make checks to see whether new user modules (especially the given user module) have got connected to the given transmission module.

Any new user module (especially the given user module) receiving this request immediately responds by sending a response message containing a unique identifier (for example the number of its MAC card or Medium Access Control card) to the given transmission module. Then, said identifier (the MAC card number of the example) is collected by the given transmission module which can then integrate the new user module into its traffic plan (and thus for example allocate a particular time slot in which the new user module can then send data).

It can be seen to it that any new user module "arriving" at the network 2000 is presented on a default wavelength and then recognized by a default transmission module (whose reception wavelength is equal to the default wavelength) and is then switched as the case may be to another transmission module for example as a function of the profile of the bit rates on the network.

It is then necessary to choose that wavelength which plays the role of a default wavelength (on which a new user module is initially presented).

It is also possible to carry out a deployment by implementing the same wavelength comb each time, doing so in the same order of introduction of the different wavelengths. It is thus ensured that the first wavelength is always present in the network, this wavelength being thus capable of constituting the default wavelength.

In compliance with an embodiment of the invention, it is possible as the case may be, at the management platform level, to introduce a constraint dictating the reservation of a part of the bit rate of the default transmission module (with which the default wavelength is associated) so that there is no blockage at the arrival of new user modules. It is also possible to reserve the default transmission module for management actions such as the connection of a new user module.

In order to get prepared for a case of dysfunction of one (or more) transmission modules, it is possible in a first implementation of a PON compliant with an embodiment of the invention, to provide for the laying out, within the network, of one or more transmission devices that are redundant and therefore in standby (or non-activated) mode but are ready to be put into operation to replace possibly malfunctioning transmission modules.

In a second implementation of a PON compliant with an embodiment of the invention, it can also be planned not to lay out redundant transmission modules in the network.

In this second implementation, in the case of dysfunction of a first transmission module, the management method according to the above-mentioned embodiment may comprise the following steps:

selecting at least one user, called a priority user module, connected to the first transmission module as a function for example of a criterion of priority associated with the user module;

connecting said at least one priority user module or modules to at least one second transmission module.

According to a third implementation of a PON compliant with an embodiment of the invention, it is possible to combine the above-mentioned first and second modes of implementation.

Thus, through the step of rearranging connections according to an embodiment of the invention, the embodiment of the present invention in enabling the optimizing of the use of the capacities of the transmission modules in operation, reduces (or even cancels out) the number of redundant transmission modules to be planned in a PON relative to the classic case where it is possible to provide for up to one redundant transmission module for each transmission module in operation.

Furthermore, even without having provided for redundant transmission modules, the second above-mentioned implementation ensures service for priority clients.

It is thus possible to guarantee a superior level of security in terms of availability of the network, reliability and quality of service for one or more priority user modules even in the event of the dysfunction of the transmission module or modules to which they are connected.

Thus, the method for managing according to an embodiment of the invention increases the number of user modules connected to the central office and/or the aggregate bit rate of the central office for a given number of transmission modules of the central office 200 of the network 2000.

It is clear that the greater the extent to which the optimization obtained through the dynamic rearrangement of an embodiment of the invention occurs on a hub comprising a great number of user modules, the more efficient it will be.

Thus, an embodiment of the invention finds increased value in the case of a PON with a rate of physical partitioning greater than that presently used.

Thus, it may be necessary to add an additional level of coupling in the infrastructure (in adding for example M×N additional couplers in the tree structures of the network, where M and N are positive natural integers). Furthermore, it can be planned to implement one or more optical amplifiers in a passive optical access network according to an embodiment of the invention between at least one transmission module and at least one user module in order to implement an amplification of at least one optical signal traveling in transit between the transmission modules and the user module or modules, to compensate for the losses due to the increase in the physical partitioning rate.

In the case of the architecture of the network 2000 according to the above-mentioned embodiment of the invention, each of the user modules, before selection by its optical filter of the signal at the wavelength that concerns it, receives all the signals (each possessing its wavelength) sent out by all transmission modules. This is permitted by the fact that the operation uses a tree structure essentially formed out of optical couplers, transparent at the wavelengths concerned and interconnected by optical fibers.

While this architecture has great flexibility in terms of rearrangement of the user modules, it has two drawbacks. Firstly, it entails the introduction of an M×N coupler accompanied by a loss of insertion increasing with the number N. Secondly, the greater the number of wavelengths reaching the filter of the user module for a given spectral range, the smaller should the spacing be between the wavelengths and the steeper should the filtering curve for this filter be in order to be able to extract only one wavelength and not be hampered by interference with the neighboring wavelengths.

In one variant of the above-mentioned embodiment of the architecture of the network 2000, the embodiment of the invention uses a tree structure essentially formed by an optical demultiplexer (of the AWG type) with cyclic response possibly complemented by M×N optical couplers transparent to the wavelengths concerned and interconnected by optical fibers.

This is then reflected in a partial broadcast of the wavelengths to the user modules downstream from these demultiplexers. Consequently, a user module no longer receives (before selection by its optical filter of the signal at the wavelength that concerns it) all the signals (each having its wavelength) sent out by all the transmission modules, but only a sub-set of these signals.

The working of an AWG type demultiplexer with cyclic multiplexer is such that the wavelengths coming from its output ports are spaced out at an interval equal to the FSR (free spectral range) of the demultiplexer.

The advantage of this variant is that a cyclic AWG type demultiplexer has quasi-constant losses as a function of the number of outputs. Furthermore, the filter at the level of the user module does not need to be very selective (the bandwidth can go up to the value of the FSR of the demultiplexer).

However, the signal sent by the user module (uplink transmission) may have the same wavelength as the received signal or a wavelength offset by a multiple of the FSR of the cyclic demultiplexer. The variant implementing at least one cyclic demultiplexer allows for a greater margin for the optical budget but on the contrary restricts the possibilities of rearrangement of the traffic in the network (limited to the sub-set of wavelengths received by the user module).

The optimum solution then is a compromise between the physical partitioning rate which is desired at the highest possible level and the constraints related to the optical budget between the transmission modules and the user modules with respect to the noise introduced by the amplification and the number of wavelengths that can be reasonably used in this context. For each particular architecture of the passive optical access network, a study of the transmission parameters must be made to determine this optimal value.

In the context of an embodiment of the present invention, certain elements of the physical layer of a classic PON can be modified. These elements are especially: firstly the "coloring" of the transmission modules and the tunability of the user modules can be done, and secondly the power value of the optical transmitters can be increased or amplification elements can be introduced to increase the partitioning rate.

The other elements such as the bit rate or the passive optical access network mechanism remain unchanged. The idea really is to use currently existing apparatuses by introducing the minimum modifications. The layout of the method for managing according to an embodiment of the invention is compatible with current mechanisms for the management of the user modules by the transmission modules.

Figure 5:
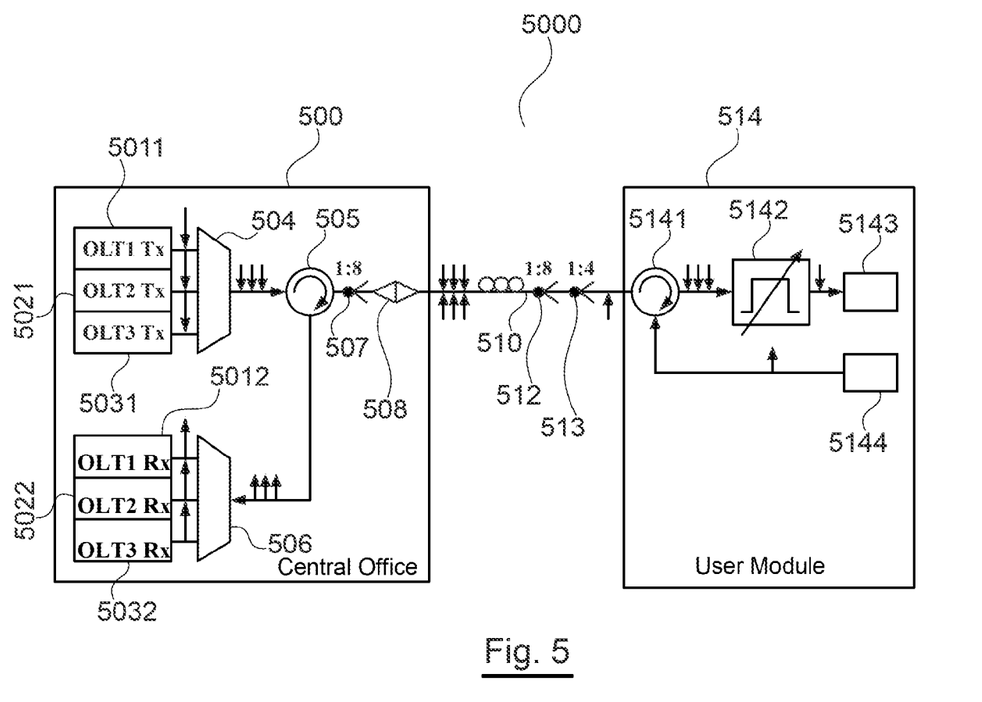
FIG. 5 is an example of implementation of a passive optical access network according to one mode of implementation of an embodiment of the invention.

Referring to FIG. 5, we present an example of implementation of a passive optical network 5000 according to a mode of implementation of an embodiment of the invention.

At the central office 500, the senders (emission light sources of the transmission modules) 5011, 5021, 5031 of the transmission modules are connected to the input ports of an optical multiplexer 504.

A circulator 505 separates the downlink signals (sent by the transmission modules) from the uplink signals (received by the transmission modules). The downlink signals are injected into the tree structure 510 of the passive optical network.

The tree structure 510 of the passive optical network comprises especially a first coupling level comprising especially a first 1×8 coupler 507 (situated in the central office 500), a second coupling level comprising especially a second 1×8 coupler 512 and a third coupling level comprising especially a third 1×4 coupler 513 interconnected by the optical fiber. Thus, the tree-like infrastructure structure 510 comprises three coupling levels.

An optical amplification stage (two-way optical amplifier) 508 is introduced into the tree structure 510 at the level of the central office 500 to compensate for the attenuation introduced by the increase in the partitioning rate. Since the passive infrastructure is a two-way structure, the amplification 507 is also a two-way amplification.

The uplink signals of the tree structure of the network are routed to an optical multiplexer 506. The demultiplexer 506 is used to direct, to each receiver 5012, 5022, 5032 of the transmission module, the wavelength intended for it.

At the user module 514, an optical circulator 5141 is responsible for routing the downlink optical signals to the wavelength-tunable optical filter 5142 of the user module and for re-injecting the signal sent out by the tunable laser 5144 of the user module in the tree structure 510 in the uplink sense.

In the example proposed, a tunable filter can be implemented upstream from a detector constituted by an avalanche photodiode 5143 and a tunable laser used to generate optical signals in the uplink sense.

Furthermore, in this example of implementation, the senders 5011, 5021, 5031 of the transmission modules are grouped together in a same first device and the receivers 5012, 5021, 5031 of the transmission modules are grouped together in a same second device. Thus, according to this implementation, each transmission module comprising a transmitter and a receiver is distributed in these first and second devices. However, naturally, in other examples of implementation of the invention, each transmission module may include a transmitter and a receiver included in a same device constituting the transmission module.

Although the present disclosure has been described with reference to one or more examples, workers skilled in the art will recognize that changes may be made in form and detail without departing from the scope of the disclosure and/or the appended claims.

The invention claimed is:

1. A method, implemented by a management platform, comprising:
   managing connections of a plurality of user modules to a plurality of transmission modules of a central office in an optical access network, a user module being able to receive from and send to at least one of said transmission modules, called a first transmission module,
   wherein the step of managing comprises, in the event of dysfunction of the first transmission module:
      selecting, among the user modules connected to the first transmission module, at least one of the user modules, called a priority user module or priority user modules, as a function of at least one predetermined criterion of priority associated with the user modules; and
      connecting said at least one priority user module to at least one second transmission module by rearranging the connection of said at least one priority user module, said rearranging comprising: tuning a sending wavelength and a reception wavelength of said at least one priority user module so that they are equal to a sending wavelength and a reception wavelength, respectively, of the at least one second transmission module selected as a function of at least one predetermined criterion of optimization.

2. The method according to claim 1, wherein said step of rearranging managing is activated in a case of a positive detection of at least one of the events belonging to the group consisting of:
   introduction of a new user module into said access network;
   introduction of a new transmission module into said access network;
   request for modifying a bit rate associated with at least one user module;
   detection of at least one congestion in bit rate in a transmission module;
   occurrence of a periodic event.

3. The method according to claim 1, wherein the rearranging managing step comprises:
   a step of obtaining a topology representing the connection of each of the user modules to the transmission modules; and
   a step of switching over the connection of at least one switched-over user module from the first transmission module to the second transmission module as a function of said at least one predetermined criterion of optimization.

4. The method according to claim 3, the switch-over step comprises the following steps:
   sending to the first transmission module a switch-over command which is then transmitted to the switched-over user module;
   tuning the sending wavelength of the switched-over user module to the reception wavelengths of the second transmission module; and
   tuning the reception wavelength of the switched-over user module to the sending wavelength of the second transmission module.

5. The method according to claim 1, wherein, at each connection of a new user module to the central office, the new user module is initially connected to a default transmission module.

6. A non-transitory computer-readable medium comprising a computer program product stored thereon and comprising a set of instructions executable by a computer to implement a method comprising:
   managing connections of a plurality of user modules to a plurality of transmission modules of a central office in an optical access network, a user module being able to receive from and send to at least one of said transmission modules, called a first transmission module,
   wherein the step of managing comprises, in the event of dysfunction of the first transmission module:
      selecting, among the user modules connected to the first transmission module, at least one of the user modules, called a priority user module or priority user modules, as a function of at least one predetermined criterion of priority associated with the user modules;
      connecting said at least one priority user module to at least one second transmission module by rearranging the connection of said at least one priority user module, said rearranging comprising tuning a sending wavelength and a reception wavelength of said user module so that they are equal to a sending wavelength and a reception wavelength, respectively, of the at least one second transmission module selected as a function of at least one predetermined criterion of optimization.

7. A platform for managing the connection of a plurality of user modules to a plurality of transmission modules of a central office in an optical access network, a user module being able to receive from and send to at least one of said transmission modules, called a first transmission module, wherein the platform comprises:
   means for selecting, among the user modules connected to the first transmission module, at least one of the user modules, called a priority user module or priority user modules, as a function of at least one predetermined criterion of priority associated with the user modules; and
   means for connecting said at least one priority user module to at least one second transmission module by rearranging a connection of said at least one priority user module, said rearranging comprising tuning a sending wavelength and a reception wavelength of said user module so that they are equal to a sending wavelength and a reception wavelength, respectively, of the at least one second transmission module selected as a function of at least one predetermined criterion of optimization,
   said means for selecting and means for connecting being activated in the event of dysfunction of the first transmission module.

8. A central office of an optical access network comprising a plurality of transmission modules connected to a plurality of user modules of the network, a user module being able to receive from and send to at least one of said transmission modules, called a first transmission module, wherein the central office comprises:

means for selecting, among the user modules connected to the first transmission module, at least one of the user modules, called a priority user module or priority user modules, as a function of at least one predetermined criterion of priority associated with the user modules; and     means for connecting said at least one priority user module to at least one second transmission module by rearranging a connection of said at least one priority user modules, said rearranging comprising tuning a sending wavelength and a reception wavelength of said user module so that they are equal to a sending wavelength and a reception wavelength, respectively, of the at least one second transmission module selected as a function of at least one predetermined criterion of optimization,     said means for selecting and means for connecting being activated in the event of dysfunction of the first transmission module.

9. An optical access network comprising a plurality of user modules to a plurality of transmission modules of a central office in an optical access network, a user module being able to receive from and send to at least one of said transmission modules, called a first transmission module, wherein the optical access network comprises:

means for selecting, among the user modules connected to the first transmission module, at least one of the user modules, called a priority user module or priority user modules, as a function of at least one predetermined criterion of priority associated with the user modules; and     means for connecting said at least one priority user module to at least one second transmission module by rearranging connections of said at least one priority user modules, said rearranging comprising tuning a sending wavelength and a reception wavelength of said user module so that they are equal to a sending wavelength and a reception wavelength, respectively, of the at least second transmission module selected as a function of at least one predetermined criterion of optimization,     said means for selecting and means for connecting being activated in the event of dysfunction of the first transmission module.

\* \* \* \* \*

UNITED STATES PATENT AND TRADEMARK OFFICE
CERTIFICATE OF CORRECTION

PATENT NO. : 8,588,608 B2  
APPLICATION NO. : 12/444261  
DATED : November 19, 2013  
INVENTOR(S) : Guignard et al.

Page 1 of 1

It is certified that error appears in the above-identified patent and that said Letters Patent is hereby corrected as shown below:

In the Claims

Column 15:

Claim 2, line 44, delete "rearranging".

Claim 3, lines 56-57, delete "rearranging".

Signed and Sealed this  
Twenty-fifth Day of August, 2015

Michelle K. Lee  
*Director of the United States Patent and Trademark Office*

UNITED STATES PATENT AND TRADEMARK OFFICE
CERTIFICATE OF CORRECTION

PATENT NO. : 8,588,608 B2  Page 1 of 1
APPLICATION NO. : 12/444261
DATED : November 19, 2013
INVENTOR(S) : Guignard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 851 days.

Signed and Sealed this
Twenty-second Day of September, 2015

Michelle K. Lee
*Director of the United States Patent and Trademark Office*